United States Patent
Greene et al.

(10) Patent No.: US 9,936,264 B1
(45) Date of Patent: Apr. 3, 2018

(54) METHOD OF RESTRICTING OFFLINE VIDEO PLAYBACK TO INCLUDE ADVERTISEMENTS

(71) Applicant: Google Inc., Mountain View, CA (US)

(72) Inventors: Kevin Greene, San Francisco, CA (US); Justin Lewis, Marina del Rey, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/486,016

(22) Filed: Sep. 15, 2014

(51) Int. Cl.
  *H04N 7/10* (2006.01)
  *H04N 21/81* (2011.01)
  *H04N 21/432* (2011.01)
  *H04N 21/239* (2011.01)
  *H04N 21/4405* (2011.01)
  *H04N 21/266* (2011.01)
  *H04N 21/462* (2011.01)

(52) U.S. Cl.
  CPC ....... *H04N 21/812* (2013.01); *H04N 21/2396* (2013.01); *H04N 21/266* (2013.01); *H04N 21/4325* (2013.01); *H04N 21/4405* (2013.01); *H04N 21/462* (2013.01)

(58) Field of Classification Search
  CPC .................................................. H04N 21/812
  See application file for complete search history.

(56) References Cited

U.S. PATENT DOCUMENTS

| | | | |
|---|---|---|---|
| 8,078,493 B2 | 12/2011 | Rosenberg et al. | |
| 8,504,652 B2* | 8/2013 | Rothschild | G06F 17/30867 709/219 |
| 2001/0049820 A1* | 12/2001 | Barton | G11B 27/105 725/32 |
| 2004/0015984 A1* | 1/2004 | Yamamoto | H04N 5/76 725/28 |
| 2005/0166224 A1* | 7/2005 | Ficco | H04H 20/106 725/35 |
| 2007/0255617 A1 | 11/2007 | Maurone et al. | |
| 2008/0016533 A1* | 1/2008 | Rothschild | H04N 7/17318 725/60 |
| 2008/0253564 A1* | 10/2008 | Kahn | H04N 7/20 380/200 |
| 2009/0076898 A1 | 3/2009 | Wang et al. | |
| 2014/0173640 A1* | 6/2014 | Walsh | G06Q 30/02 725/8 |
| 2014/0281489 A1* | 9/2014 | Peterka | H04L 63/0464 713/153 |

OTHER PUBLICATIONS

"Public-key Cryptography", Wkipedia, Aug. 18, 2014, pp. 1-15 en.wikipedia.org/w/index.php?title=Public-key_cryptography &oldid=621772859.

* cited by examiner

*Primary Examiner* — Olugbenga Idowu
(74) *Attorney, Agent, or Firm* — Lowenstein Sandler LLP (57) ABSTRACT

A method may include receiving, by a processing device of a user device, a media item and storing the media item in a local store for offline playback of the media item on the user device, responsive to a user request to play the media item, identifying one or more offline playback settings associated with the media item, determining, based on the offline playback settings, whether the media item is to be played with an advertisement, and if the media item is to be played with the advertisement, providing playback of the media item from the local store with the advertisement on the user device.

20 Claims, 4 Drawing Sheets

METHOD OF RESTRICTING OFFLINE VIDEO PLAYBACK TO INCLUDE ADVERTISEMENTS

TECHNICAL FIELD

This disclosure relates to the field of media content playback and, in particular, to systems and methods to restrict offline video playback to include advertisements.

BACKGROUND

Media items such as video and audio items are often aggregated on a content sharing platform belonging to a content distributor for users to consume through streaming playback over the Internet. For example, the owner of a media item may upload the media item to a public content sharing platform so that users may easily discover the media item through search engines and enjoy the media item through streaming playback. The owner of the media item and/or the content distributor may want to monetize the media item. For example, the owner of the media item and/or the content distributor may decide that the media item should be distributed with advertisements in return to allowing the playback of the media item to be free of charge.

Users may use user devices to consume media items. User devices may include desktop computers, laptop computers, tablet computers, handheld devices (such as portable media players and smart phones), and any suitable devices. Media content may include, but are not limited to, video clips, audio clips, and images which are collectively referred to hereinafter as media items. To ensure the monetization of the media items, the content distributor and/or the owners of the media items may prevent users from downloading the media items outright to their own user devices for fear of losing control of the media item.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure may include a method including receiving, by a processing device of a user device, a media item and storing the media item in a local store for offline playback of the media item on the user device, responsive to a user request to play the media item, identifying one or more offline playback settings associated with the media item, determining, based on the offline playback settings, whether the media item is to be played with an advertisement, and if the media item is to be played with the advertisement, providing playback of the media item from the local store with the advertisement on the user device.

Implementations of the disclosure may include a method including receiving, by a processing device of a server, a request to provide a media item for offline playback on a user device, determining that the media item is to be played offline with an advertisement, providing the media item to the user device, and causing the advertisement to be provided to the user device to be played with the media item.

Implementations of the disclosure may include an apparatus including a data store and a processing device communicatively coupled to the data store, the processing device to execute instructions to: receive a media item and store the media item in a local store for offline playback of the media item on the user device, responsive to a user request to play the media item, identify one or more offline playback settings associated with the media item, determine, based on the one or more offline playback settings, whether the media item is to be played with an advertisement, and if the media item is to be played with the advertisement, provide playback of the media item from the local store with the advertisement on the user device.

BRIEF DESCRIPTION OF THE DRAWINGS

The present disclosure is illustrated by way of example, and not by way of limitation, in the figures of the accompanying drawings.

DETAILED DESCRIPTION

Under certain situations, a user may want to download one or more media items to a user device to allow later offline playback of the media item on the user device. The download is the process to copy the data file of the media item from a content sharing platform to the user device. For example, the offline playback feature may allow users to download videos to their mobile devices and then watch the video later even when the user devices are not connected to the internet or when the users are offline.

Sometimes, even when the user device is connected to the internet, the user may still choose to play the copy that has been downloaded to the user device and stored in a local store of the user device because the download version may have a higher quality than the streaming version due to the limited bandwidth made available for streaming. Besides, mobile internet is known to be unreliable. Therefore, even if the streaming playback of the video may have started out on a good internet connection, it is possible that the connection may deteriorate, which may cause the video player to switch to a lower quality stream. Therefore, the user may prefer to play the local copy of a media item over streaming from a content sharing platform whenever the local copy is available.

As discussed above, content owners and/or content sharing platforms may want to monetize media items and be able to dictate whether the media items should be played with advertisements or advertisements. However, current mechanisms usually do not allow a content owner or a content sharing platform to ensure that offline content and/or content stored locally on a user device is played on the user device with advertisements.

Aspects of the present disclosure address the above mentioned deficiencies by allowing offline or local playback of media items downloaded from a content sharing platform to user devices while enabling the insertion of advertisements before, during, or after the offline or local playback of the media item on the user device.

Figure 1:
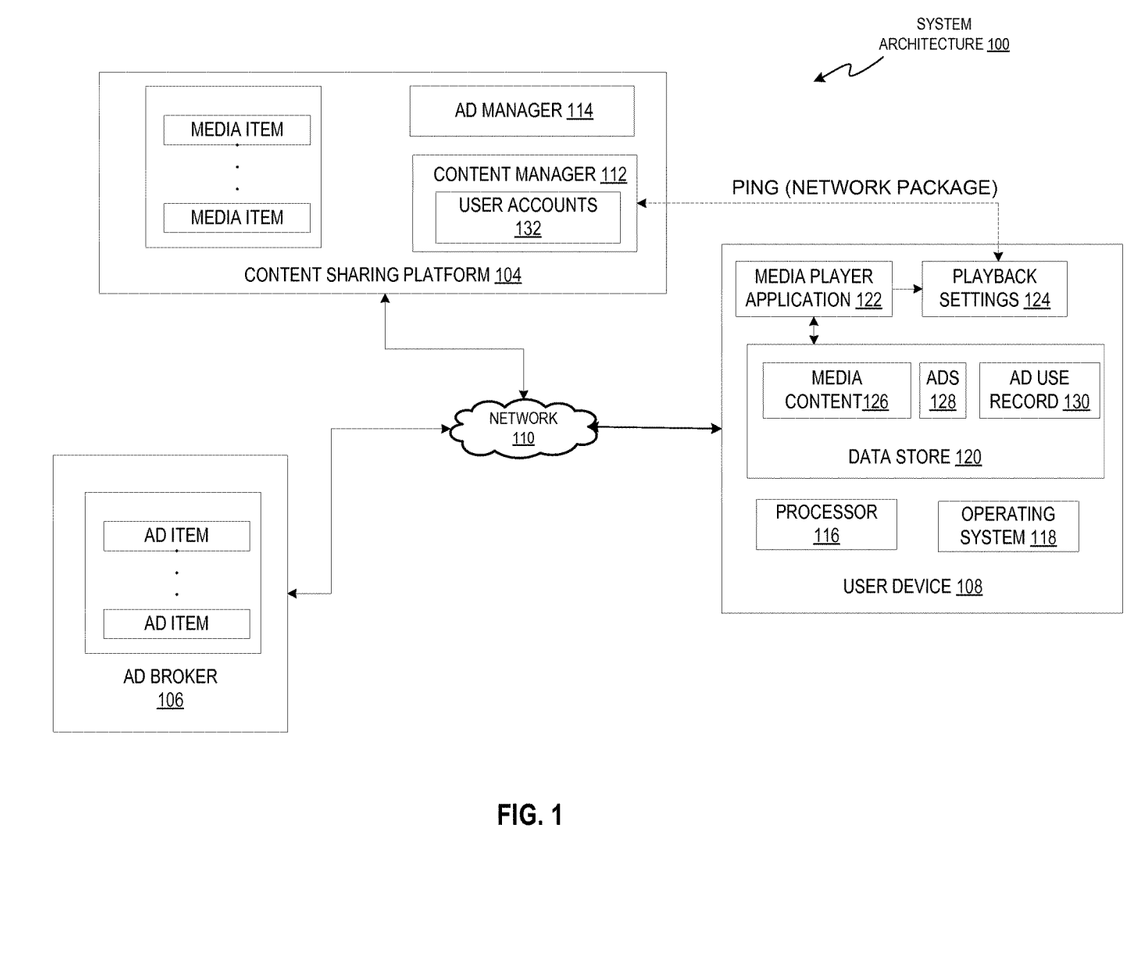
FIG. 1 illustrates a system that provides a platform for a user to download a media item to a user device and play the media item offline on the user device according to an implementation of the disclosure.

FIG. 1 illustrates a system 100 that provides a platform for a user to download a media item to a user device and play the media item offline on the user device according to an implementation of the disclosure. The system 100 may include a content sharing platform 104, an advertisement broker 106, a user device 108, and a network 110. The user device 108 may be connected to the content sharing platform 104, and the advertisement broker 106 via the network 110. In one implementation, the network 110 may include a public network (e.g., the internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

The content sharing platform 104 may be a computing platform having data stores to store media items to be consumed at the user device 108. The advertisement broker 106 may be a supplier of advertisements to be presented with the playback of the media items on the user device 108. The content sharing platform 104 may include a content manager 112 and an advertisement manager 114 that respectively manage the provision of media items and the associated advertisements to the user device 108. In some implementations, the content sharing platform 104, and the advertisement broker 106 are separate entities that are connected through the network 110. For example, the advertisement broker 106 may be a third party advertisement supplier, and the content sharing platform 104 may select an advertisement based on a user profile, advertisement availability and rates, and matches between the media item and identified advertisements. In some other implementations, the content sharing platform 104, and the advertisement broker 106 may be part of a comprehensive content sharing platform. Namely, a single entity may provide all of the services of content sharing, advertisement broker, content manager, and advertisement manager to the user device.

In one implementation, the content sharing platform 104 may include one or more computing devices (such as a rackmount server, a router computer, a server computer, a personal computer, a mainframe computer, a laptop computer, a tablet computer, a desktop computer, etc.) and one or more data stores (e.g., hard disks, memories, databases) in which media items may be stored. The media items can be digital audio, digital video, digital images, electronic books, or any suitable forms of content that may be consumed on a user device. A data store can store media content or links to media content and can include one or more writable persistent storage devices, such as memories, tapes or disks. The content sharing platform 104 may also include software components that may be used to associate a media item with metadata that contains attributes and characterization of the media item. For example, the metadata of a video may include monetization attributes that indicate whether the video should be monetized, and/or the advertisement formats supported by the video. The formats may include, for example, in-stream ads that can run in the media player with the featured video content (e.g., a short video advertisement before the feature video), skippable ads that can be skipped after a period of viewing time (e.g., a video advertisement that allows for skipping after five seconds of viewing), and banner ads that can be embedded in a web page that contains the media player, etc.

The content sharing platform 104 may be identified by a Uniform Resource Locator (URL) (or a web address) according to which media items may be uploaded to the content sharing platform 104, searched, streamed, and downloaded to the user device 108. For example, a content creator or owner of a media item may upload the media item to the content sharing platform 104 so that other users may search for, consume by streaming or downloading to the user device 108, or comment on the media item.

The advertisement broker 106 may similarly include one or more computing devices and data stores in which advertisements may be stored. Advertisements may be in different forms including clips of digital audio, digital video, text, or images that are created to promote a product, service, or event. Advertisements are created on behalf of businesses or organizations to advance their purposes. Advertisements may be designed towards certain demographic populations and be paid according to metrics indicating how many viewers have seen the advertisements.

The content sharing platform 104 may include a content manager 112 that may, in response to a user selection of a media item, determine how to provide the media item to the user device 108. For example, the content manager 112 may determine whether the user's selection of the media item indicates a request for streaming playback or a request for downloading to a user device for a later offline playback. The content manager 112 may also determine whether an advertisement should be played with the media item. The term "offline playback" as used herein refers to a media item playback on a user device when the user device is not connected to the Internet or to a playback of a media item previously downloaded to and stored locally on the user device (as opposed to a playback of a media item being streamed from a content sharing platform).

In some implementations, content manager 112 may maintain a set of ad presentation rules and/or parameters for presentation/playback of advertisements. The rules may specify how many ads are allowed to be presented to a user during a certain time period (e.g., if a user has seen an ad in the last 5 minutes, the user should not be currently presented with another ad), conditions for presenting skippable or non-skippable ads, maximum number of ads to be presented to a user during playback of a single video, etc.

In one implementation, content manager 112 may maintain one or more user accounts 132 that had been created for users. Each user account may include information of the user. For example, a user may first register a user account with the content sharing platform 104. During the registration, the user may elect to subscribe to a service (e.g., premier or paid service) which allows the user to consume media items provided by the content sharing platform free of advertisement, or elect to register for a service (e.g., regular service) that provides media items to user devices with advertisements. This subscription information may be specified in the user account. The content sharing platform 104 may also collect certain information from the user including user's name and parameters of the user device. The user account may specify the same or different monetization settings for streamed playback and local (or offline) playback. In addition, the user account may specify the same or different monetization settings for audio-only playback (e.g., background or screen-off listening) and audio/video playback. The user may have different user accounts (e.g., different accounts for streamed and offline playback with different monetization settings).

In one implementation, if the content manager 112 determines from the user account stored on the content sharing platform 104 that the user who requests the media item has subscribed to an advertisement-free service, the content manager 112 may provide the requested media item to the user device 108 either in the form of streaming or download without any accompanying advertisement and set the playback setting 124 on the user device 108 to advertisement-free. However, if the content manager 112 determines that the user should consume the media item on the user device with one or more advertisements, the content manager 112 may send an advertisement request to the advertisement broker 114. The advertisement request may include certain attributes about the media item and some other attributes (e.g., geographic location including city, state, or country) of the user device, and the type of the user device, etc.). Based on the attributes, the advertisement manager 114 may identify and provide one or more advertisements to the user device 108.

The user device 108 may include computing devices such as personal computers (PCs), laptops, mobile phones, smart phones, tablet computers, netbook computers, etc. In some implementations, the user device 108 may also be referred to as "client devices." In one implementation, the user device 108 may include hardware components such as a processor (such as a CPU 116) and a data store 120, and software components such as an operating system 116 and a media player 122. The processor 116 may execute both system applications (such as the operating system 118) and user applications (such as the media player 122). The data store 120 may be a storage device such as hard disks, memories, and databases in which data files may be stored. The data files may include media content 126 (containing media items downloaded from the content sharing platform 104 and media items that the user obtained from other sources), advertisements 128 that are downloaded to the user device 108, and an advertisement use record 130 (a data file that records the presentation of advertisements on the user device).

The operating system 118 may manage resources and schedule the execution of applications on the user device. In one implementation, the media player 122 may be an application that allows users to consume media items, such as images, videos, audio, web pages, documents, etc. For example, the media player 122 may be a web browser that can access, retrieve, present, and/or navigate content (e.g., web pages such as Hyper Text Markup Language (HTML) pages, digital media items, etc.) served by a web server. The media player 122 may render, display, and/or present the content (e.g., a web page) through a display screen and/or speakers on a user device to a user. The media player 122 may also be an embedded application (e.g., a Flash® player or an HTML5 player) that is embedded in a web page (e.g., a web page that may provide information about a product sold by an online merchant). In another example, the media player 122 may be a standalone application (e.g., a mobile app) that allows users to consume media items (e.g., digital videos, digital images, electronic books, etc.).

The media player 122 may be provided to the user device 108 by the content sharing platform 104. For example, the media player 122 may be embedded media players that are embedded in web pages provided by the content sharing platform 104. In another example, the media player 122 may be applications that are downloaded from the content sharing platform 104 and installed on the user device 108.

In general, functions described in one implementation as being performed by the content sharing platform 104 can also be performed on the user device 108 in other implementations if appropriate. In addition, the functionality attributed to a particular component can be performed by different or multiple components operating together. The content sharing platform 104 can also be accessed as a service provided to other systems or devices through appropriate application programming interfaces, and thus is not limited to use in websites.

The media player 122 may include a user interface to search and select a media item provided by the content sharing platform 104. In one implementation, in response to a query entered into a search engine, the search engine may present one or more links to media items on the user interface for selection. The link for each media item may be presented with a streaming playback option and a download and offline playback option. If the user selects the option of streaming playback, the user device 108 may send the request including the identifier for the media item, an indicator for the streaming playback option, and the user account identification to the content sharing platform 104 where the content manager 112 may determine whether advertisements should be inserted into the streaming playback based on the media item metadata and the user account stored on the content sharing platform 104. As discussed above, if the content manager 112 determines that advertisements should be inserted, the content manager 112 may send a request to the advertisement manager 114 to identify one or more advertisements to be presented at the media player 122 on the user device 108. The content manager 112 may cause the content sharing platform 104 to stream the selected media item and cause the advertisement broker 114 to provide the identified advertisements to the user device 108. The content manager 112 may also provide instructions for presenting advertisements to the user device 108 based on ad presentation rules of the content sharing platform 104. If the content manager 112 determines that the user is subscribed to an advertisement-free service, the content manager 112 may cause the content sharing platform 104 to stream the selected media item to the user device 108 free of advertisements.

If the user selects the option of offline playback, the user device 108 may send the request including the identifier for the media item, an indicator for the offline playback option, and the user account to the content sharing platform 104 where the content manager 112 may determine whether advertisements should be inserted into the offline playback based on the attributes of the media item and the user account. If the content manager 112 determines, based on the user account, that the user is subscribed to an advertisement-free service, the content manager 112 may cause the content sharing platform 104 to provide the media item to be stored in the data store 120 of the user device 108. If the user is not subscribed to an advertisement-free service, the content manager 122 may determine that the settings of the requested media item (e.g., based on metadata of the media item) indicate that the requested media item should be monetize, and send a request to the advertisement broker 114 to identify one or more advertisements to be presented at the media player 122 on the user device 108. The content manager 122 may cause the content sharing platform 104 to provide the selected media item to the user device 108 and cause the advertisement broker 106 to provide the identified advertisements to the user device 108. Both the selected media item and the identified advertisements may be stored in the data store 120 (e.g., as the media content 126 and advertisements 128) of the user device 108 for the offline playback. The content manager 122 may also set up the playback setting 124 of the media player 122 to a state of offline playback with advertisement so that the media player 122 can play the media item with the advertisements.

The playback settings 124 may be a data file stored on the user device 108 that dictates the media player 122 as to how to play the media item offline. In one implementation, the playback settings 124 may include a per media item setting that may include information of how the media item should be played. For example, the playback settings 124 for the media item may include a flag indicating whether the media item should be monetized. The playback settings 124 may also include advertisement formats supported by the media item (such as in-stream advertisements, skippable advertisements, banner advertisements, or companion advertisements). Per media item settings may be downloaded to the user device and added to the playback settings 124 together with or in addition to the downloaded media item to be played offline.

In one implementation, the playback settings 124 may include per user settings including the identifications of the user account(s) and group(s) of users that the user belongs to. Per user settings may also include the same or different monetization settings for audio-only playback (e.g., background or screen-off listening) and audio/video playback. Per user settings may be saved locally on the user device when the user subscribes to a service including offline playback and/or each time the user requests offline playback of a media item.

In one implementation, the playback settings 124 may include per user device settings including global settings for all users of the user device 108. For example, the playback setting 124 may include rules of advertisement playback (such as number of seconds between the playbacks of a same advertisement). In some implementations, rules of advertisement playback (per user device settings) may be saved locally on the user device when the user subscribes to a service including offline playback and/or each time the user requests offline playback of a media item.

In one implementation, to prevent a user from playing the downloaded media item in the offline playback mode without viewing or listening to advertisements, the content manager 112 may first convert the requested media item into a format that may not be presented to the user without an affirmation that the user has consumed at least part of the advertisements. In one implementation, the content manager 122 may encrypt the media item with an encryption key prior to the transmission of the media item to the user device 108 and then provide the encrypted media item to the user device 108 to be stored in the data store 120. When the user elects to play the media item offline, the media player 122 may determine whether the offline playback requires the insertion of advertisements based on the playback setting 124. If the media player 122 determines that the user may consume the media item offline without advertisements, the media player 122 may decrypt the media item with a decryption key that is stored on the user device 108 and then play the media item after the decryption.

In one implementation, the media player may ping the content sharing platform 104 for the decryption key, and then decrypt the media item with the received decryption key. The ping may be a network utility packet transmitted between the content sharing platform 104 and the user device 108. The ping may include the subscription status associated with the user account. The content manager 112 may receive the ping, determine based on the user account that media items requested by the user for offline playback should be monetized, and provide the decryption key to the media player if the media player confirms that monetization conditions are satisfied (e.g., if the media item to be played offline requires monetization, and at least initial advertisement consumption conditions are satisfied with the respect to the media item).

If the media player 122 determines from the playback setting 124 that the media item cannot be played offline without advertisements, the media player may either start playing at least part of the advertisements stored in data store 120 or start streaming advertisements from advertisement broker 106 to the user device 108. Once the media player 122 determines that the user has satisfied the advertisement requirement (e.g., by viewing an advertisement for at least a predetermined time period), the media player 122 may ping the content sharing platform 104 with a request for a decryption key to decrypt the media item. The ping from the user device 108 may include an indication that the user has met the advertisement consumption requirement. Once the media player 122 receives the decryption key from the content sharing platform 104 and decrypt the media content, the media player 122 may proceed to present the media item to the user in an offline playback mode.

In one implementation, to prevent unauthorized offline playback of the media item, the media item may be stored in a section of the data store 120 that can be accessed only by the media player 122. Thus, a user of the user device 108 may not copy or play the media item with another unauthorized software application.

During the offline playback of the media item and the associated advertisements, the media player 122 may also keep a record of advertisement usage including advertisements that have been played and how long they are played. The statistics of advertisement usage may be stored in the advertisement use record 130. The advertisement usage data may be transmitted to the content sharing platform 104 periodically or whenever the user device is online so that the advertisement manager 114 may calculate advertisements to be charged to the advertisement broker 106.

Figure 2:
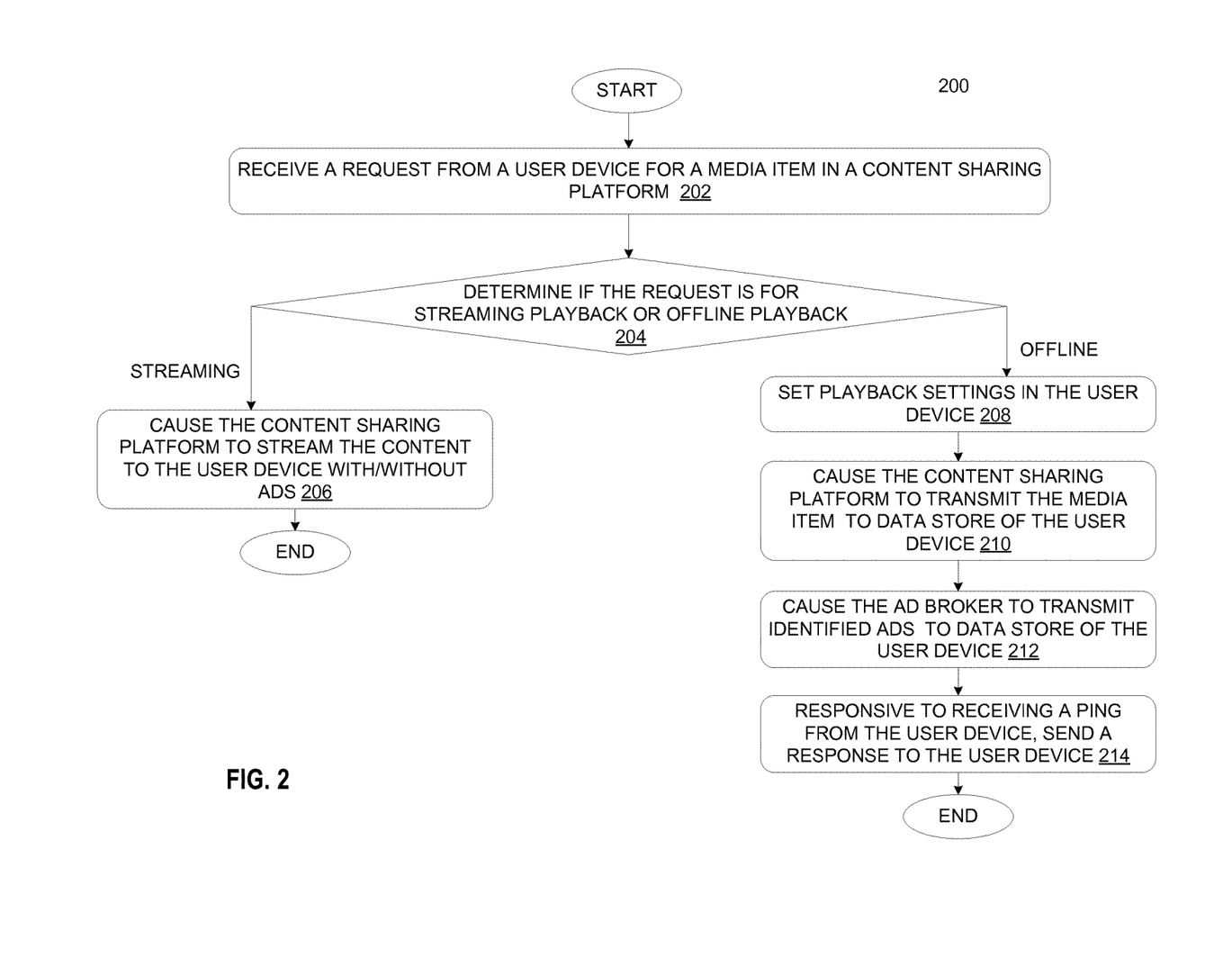
FIG. 2 is a flow diagram illustrating a method for a content sharing platform to manage offline playback of a media item on a user device according to an implementation of the disclosure.

FIG. 2 is a flow diagram illustrating a method 200 for a content sharing platform to manage offline playback of a media item on a user device according to an implementation of the disclosure. The method 200 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by content manager 112 of the content sharing platform 104 as shown in FIG. 1.

Referring to FIG. 2, after a start, at 202, the content manager may receive a request from a user device for a playback of a media item provided at a content sharing platform. The request may be generated when a user selects a hyperlink presented on the user device. In one implementation, the media player may present the hyperlink with playback options including a streaming playback option and an offline playback option. The request received from the user device by the content manager may include a first data field indicating whether the user selects the streaming playback option or offline playback option. The request may also include a second data field indicating the user account. The user account may include, for example, settings indicating whether the user is subscribed to the advertisement-fee service, whether the user is subscribed to offline playback, the user devices associated with the user account, etc.

At 204, the content manager may determine if the request is for a streaming playback or offline playback of the media item based on the information in the request. If the content manager determines that the user requests the streaming playback, at 206, the content manager may determine whether the user is a subscribing user who can consume the media item without advertisements. If so, the content manager may initiate the streaming of the media item from the content sharing platform to the user device. If not, the content manager may send an advertisement request to an advertisement broker for advertisements that match the user account and/or the content of the requested media item. The content manager may request the advertisement broker to stream the advertisements to the user device and request the content sharing platform to stream the media item to the user device. In some embodiments, prior to sending an advertisement request, the content manager checks the settings of the media item to confirm that the media item should be monetized. The advertisements may be played before, during, or after the streaming playback of the media item.

If the content manager determines that the user requests the offline playback, at 208, the content manager may set up one or more playback settings in the user device based on the user profile. The one or more playback settings may include playback settings of the requested media item, of the user account, and/or of the user device. The one or more playback settings may indicate offline playback with advertisements and offline playback without advertisements.

In one implementation, the content manager may encrypt the media item with an encryption key to prevent unauthorized playback of the media at the user device. In one implementation, the content manager encrypts a certain portion of the media item or certain attribute data of the media item to the extent that the playback of the media item is not possible without decrypting the portion or the attribute data of the media item. For example, the content manager may encrypt the header file of the media item where the header file includes the playback parameters.

At 210, the content manager may instruct the content sharing platform to transmit the encrypted media item to a data store of the user device. The media item may be stored in the data store for a later offline playback. At 212, the content manager may similarly determine whether the user is subscribed to an advertisement-free service. If the content manager, based on the user account, determines that the user is not subscribed to the advertisement-free service, the content manager may request advertisements that match the user account settings and/or the media item settings from the advertisement broker. The advertisement broker may transmit the identified advertisements to the data store of the user device before the offline playback of the media item on the user device. The advertisements in the local data store may be used when the offline playback begins.

The user device may, in response to a user request, send an offline playback request to the content manager. The request may be in the form of a network ping which may include the identification of the user (and/or the user device). In one implementation, at 214, in response to receiving the ping from the user device, the content manager may transmit an instruction to the user device to allow the media player to play the media item offline in accordance with the one or more playback settings.

In one implementation, in response to the ping, the content manager may transmit a decryption key that matches the encryption key to the media player of the user device. The media player of the user device may then decrypt the encrypted portion of the media item to begin the offline playback process. In this way, the content sharing platform may restrict the offline playback of the media item with advertisements.

Figure 3:
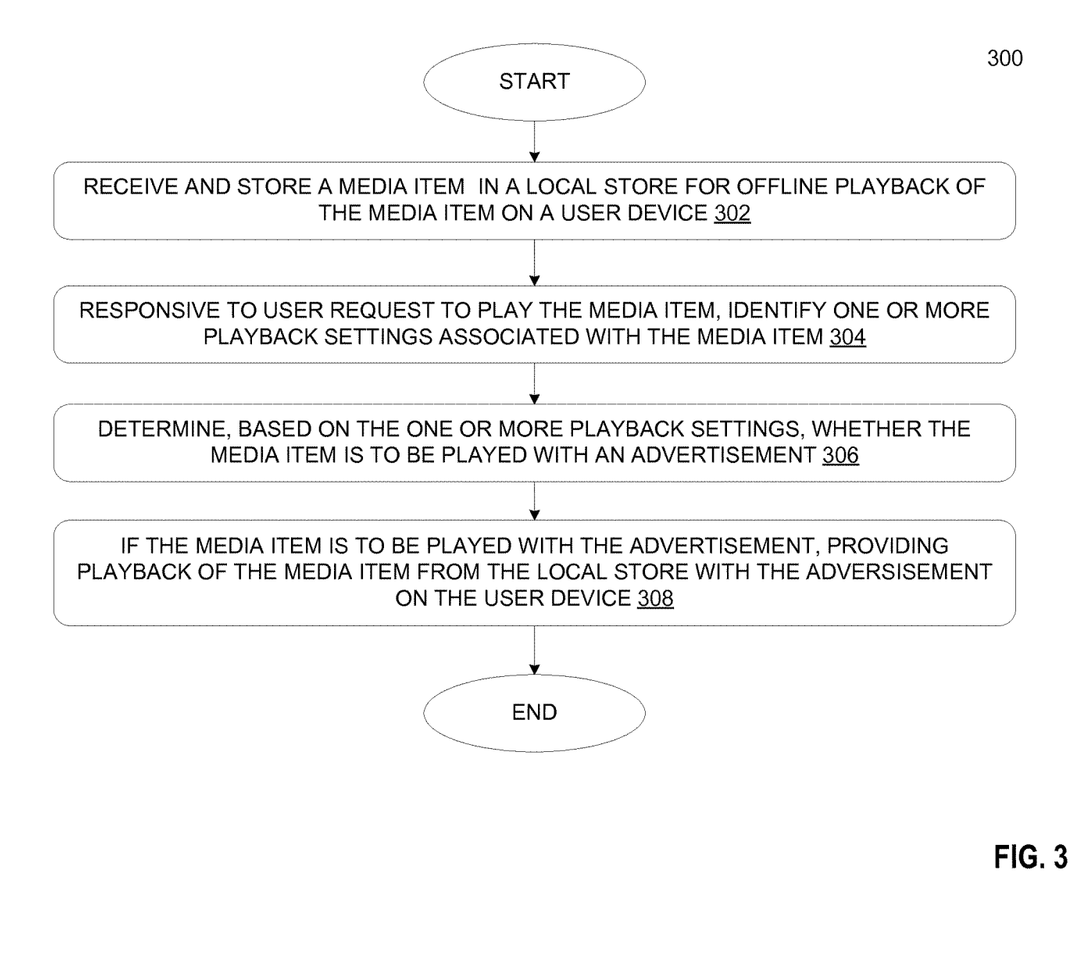
FIG. 3 is a flow diagram illustrating a method to play a media item offline on a user device according to an implementation of the disclosure.

The media player installed on the user device may receive the media item and store the media item and associated advertisements in the data store of the user device. FIG. 3 is a flow diagram illustrating a method 300 to play a media item offline on a user device according to an implementation of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In one implementation, method 300 may be performed by the processor 116 of the user device 108 as shown in FIG. 1.

Referring to FIG. 3, at 302, in response to the user's selection of a media item for an offline playback on the user device, the processor of the user device may receive the media item from the content sharing platform and store the media item in a data store of the user device. In one implementation, a portion of the received media item or an attribute file of the media item may have been encrypted to prevent unauthorized playback of the media item. As discussed in more detail below, the content sharing platform may also send playback settings (user account settings, user device settings and/or media item monetization settings) to the user device, and the playback settings are then saved locally on the user device.

At 304, after the download of the media item in its entirety to the data store of the user device and in response to a user request to play the media item using the media player on the user device, the processor may identify one or more playback settings associated with the media item. The one or more playback settings may include information about how the media item may be played offline on the user device. For example, the one or more playback settings may include information of whether the playback should include advertisements.

At 306, the processor may determine, based on the one or more playback settings, whether the media item is to be played with an advertisement. At 308, if the media item is to be played with the advertisement, the processor may provide playback of the media item from the local data store with the advertisement on the user device. In one implementation, prior to the playback, the media player may ping the content manager of the content sharing platform to get an approval of the playback, and/or a decryption key to decrypt the encrypted version of the media item. The advertisement may be played before, during, or after the playback of the media item. Further, the media player may keep a record of the statistics of the usage of the advertisement on the user device and transmit the statistics to the content sharing platform periodically or whenever the user device is online.

Figure 4:
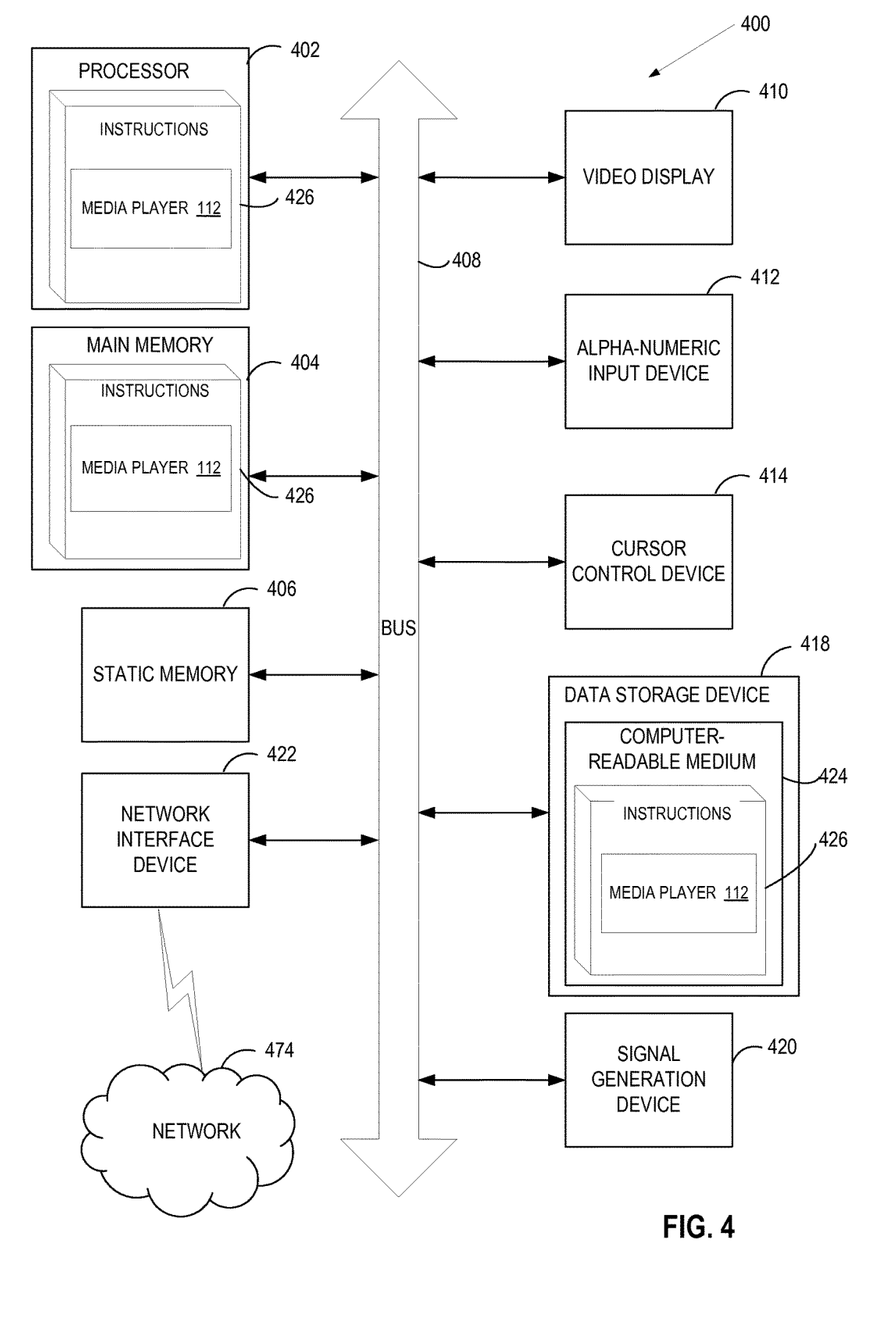
FIG. 4 is a block diagram illustrating an exemplary computer system, according to some implementations.

FIG. 4 illustrates a diagrammatic representation of a machine in the exemplary form of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD), a cathode ray tube (CRT), or a touch screen), an alphanumeric input device 412 (e.g., a keyboard), a cursor control device 414 (e.g., a mouse), and a signal generation device 420 (e.g., a speaker).

The data storage device 418 may include a computer-readable storage medium 424 on which is stored one or more sets of instructions 426 (e.g., software) embodying any one or more of the methodologies or functions described herein. The instructions 426 may also reside, completely or at least partially, within the main memory 404 and/or within the processor 402 during execution thereof by the computer system 400, the main memory 404 and the processor 402 also constituting computer-readable storage media. The instructions 426 may further be transmitted or received over a network 474 via the network interface device 422.

In one implementation, the instructions 426 include instructions for a media player 122, which may correspond, respectively, to their identically-named counterparts described with respect to FIG. 1, and/or a software library containing methods that manage the playback of a playlist on a content sharing platform. While the computer-readable storage medium 424 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   receiving, by a processing device of a user device, a media item that is advertisement-free and storing the media item in a local store for offline playback of the media item on the user device;
   responsive to a user request to play the media item, identifying one or more offline playback settings associated with the media item;
   determining, based on the one or more offline playback settings, whether the media item is to be played with an advertisement that is to be provided separately from the media item, wherein the one or more offline playback settings comprise an indicator specifying whether the media item is to be played with the advertisement or advertisement-free;
   in response to determining that the media item is to be played with the advertisement, providing playback of the media item from the local store with the advertisement on the user device; and
   in response to determining that the media item is to be played advertisement-free,
      transmitting a request comprising a subscription status associated with a user account to a content sharing platform for an approval to play the media item from the local store; and
      responsive to receiving the approval from the content sharing platform, providing playback of the media item from the local store free of the advertisement on the user device.

2. The method of claim 1, wherein providing the playback of the media item with the advertisement comprises presenting the advertisement prior to starting the playback of the media item.

3. The method of claim 1, wherein providing the playback of the media item with the advertisement comprises presenting the advertisement during the playback of the media item starts.

4. The method of claim 1, wherein providing the playback of the media item with the advertisement comprises presenting the advertisement after the playback of the media item starts.

5. The method of claim 1, further comprising:
   receiving the advertisement prior to the playback of the media item; and
   storing the advertisement in the local store.

6. The method of claim 1, further comprising receiving the one or more offline playback settings from a content sharing platform.

7. The method of claim 1, wherein the request for the approval comprises a network packet.

8. The method of claim 1, further comprising:
   receiving a decryption key from the content sharing platform; and
   decrypting the media item prior to providing the playback of the media item.

9. An apparatus comprising:
   a data store; and
   a processing device communicatively coupled to the data store, the processing device to execute instructions to:
      receive a media item that is advertisement-free and store the media item in a local store for offline playback of the media item on the apparatus;
      responsive to a user request to play the media item, identify one or more offline playback settings associated with the media item;
      determine, based on the one or more offline playback settings, whether the media item is to be played with an advertisement that is to be provided separately from the media item, wherein the one or more offline playback settings comprise an indicator specifying whether the media item is to be played with the advertisement or advertisement-free;
      in response to determining that the media item is to be played with the advertisement, provide playback of the media item from the local store with the advertisement on the apparatus; and
      in response to determining that the media item is to be played advertisement-free,
         transmit a request comprising a subscription status associated with a user account to a content sharing platform to play the media item from the local store; and
         responsive to receiving the approval from the content sharing platform, providing playback of the media item from the local store free of the advertisement on the user device.

10. The apparatus of claim 9, wherein to provide the playback of the media item with the advertisement comprises to present the advertisement prior to starting the playback of the media item.

11. The apparatus of claim 9, wherein to provide the playback of the media item with the advertisement comprises to present the advertisement during the playback of the media item starts.

12. The apparatus of claim 9, wherein to provide the playback of the media item with the advertisement comprises to present the advertisement after the playback of the media item starts.

13. The apparatus of claim 9, wherein the processing device is further to:
   receive the advertisement prior to the playback of the media item; and
   store the advertisement in the local store.

14. The apparatus of claim 9, wherein the processing device is further to receive the one or more offline playback settings from a content sharing platform.

15. The apparatus of claim 9, wherein the request for the approval comprises a network packet.

16. The apparatus of claim 9, wherein the processing device is further to:
   receive a decryption key from the content sharing platform; and
   decrypt the media item prior to providing the playback of the media item.

17. A machine-readable non-transitory storage medium storing instructions that, when executed, cause a processing device of a user device to perform operations comprising:
   receiving a media item that is advertisement-free and storing the media item in a local store for offline playback of the media item on the user device;
   responsive to a user request to play the media item, identifying one or more offline playback settings associated with the media item;
   determining, based on the one or more offline playback settings, whether the media item is to be played with an advertisement that is to be provided separately from the media item, wherein the one or more offline playback settings comprise an indicator specifying whether the media item is to be played with the advertisement or advertisement-free;
   in response to determining that the media item is to be played with the advertisement, providing playback of the media item from the local store with the advertisement on the user device; and
   in response to determining that the media item is to be played advertisement-free,
      transmitting a request comprising a subscription status associated with a user account to a content sharing platform for an approval to play the media item from the local store; and
      responsive to receiving the approval from the content sharing platform, providing playback of the media item from the local store free of the advertisement on the user device.

18. The machine-readable non-transitory storage medium of claim 17, wherein providing the playback of the media item with the advertisement comprises presenting the advertisement prior to starting the playback of the media item.

19. The machine-readable non-transitory storage medium of claim 17, wherein providing the playback of the media item with the advertisement comprises presenting the advertisement during the playback of the media item starts.

20. The machine-readable non-transitory storage medium of claim 17, wherein providing the playback of the media item with the advertisement comprises presenting the advertisement after the playback of the media item starts.

* * * * *